United States Patent Office 3,154,727
Patented Oct. 27, 1964

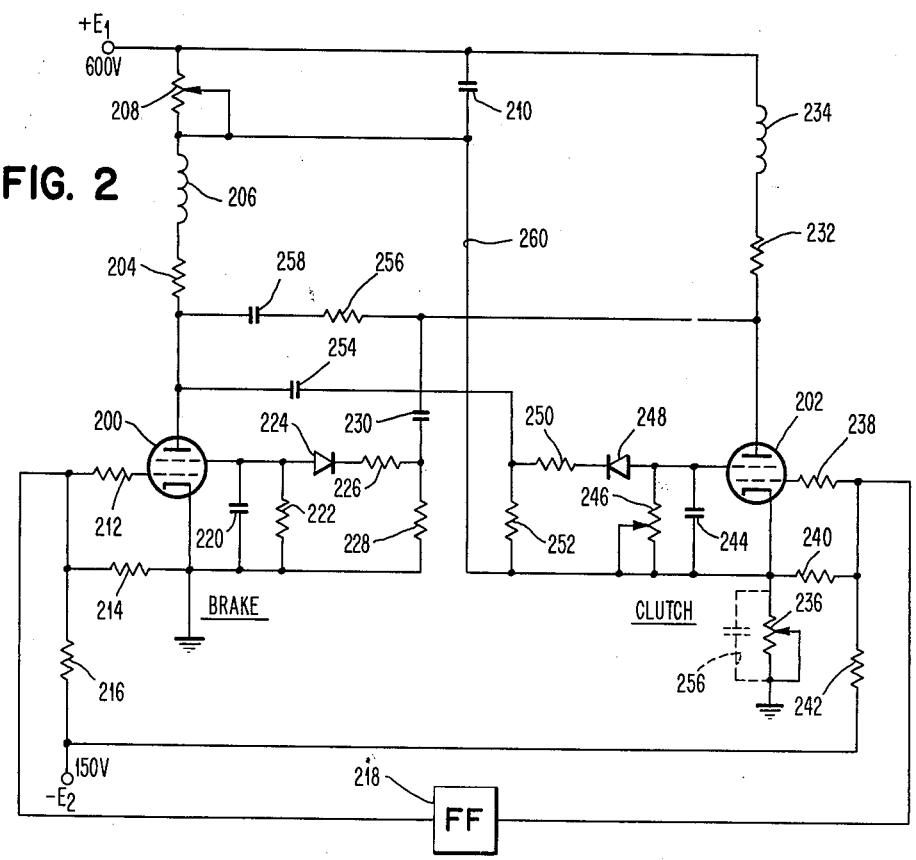
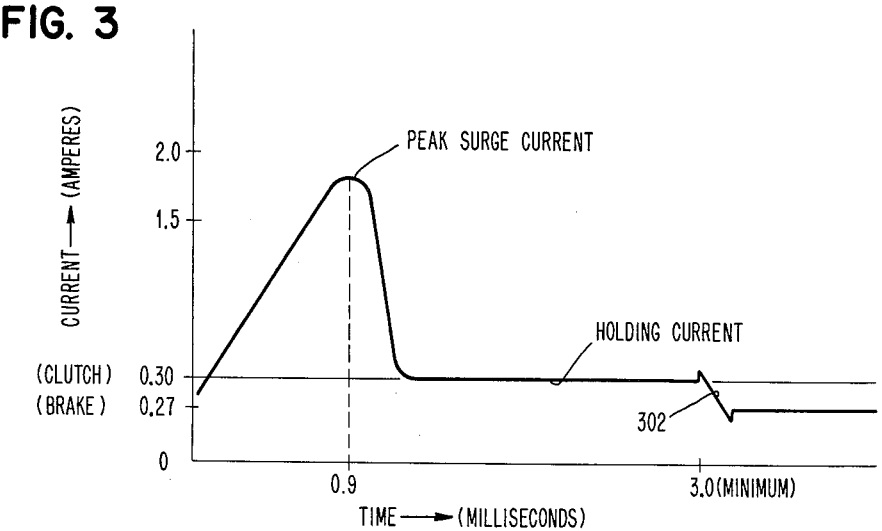

3,154,727
HIGH SPEED CLUTCH AND BRAKE ACTUATING CIRCUIT
Leonard Robin Hulls, Gwynedd Valley, Pa., assignor to Sperry Rand Corporation, New York, N.Y., a corporation of Delaware
Filed Oct. 10, 1961, Ser. No. 147,390
9 Claims. (Cl. 317—149)

This invention relates to a clutch and brake mechanism. In particular, the invention relates to the control circuit which is utilized to actuate either the clutch or the brake independently whereby an output device may be operated or not in accordance with the input supplied to the control circuit.

The clutch and brake mechanism shown herein, may be used to drive certain capstans in various tape handling equipment, for example Uniservo systems, which are utilized with high speed computing machines or other business machines. The operation of the capstan which drives the tape is controlled by an electromagnetic clutch-brake mechanism or unidirectional clutch. The name unidirectional clutch is applied to a clutch-brake mechanism which rotates the capstan in the direction that the driving motor is rotating. As may be appreciated, the tape utilized in the tape transport or tape handling equipment must be capable of being accelerated or decelerated at extremely high rates. This extremely high acceleration or deceleration rate is required in order that information may be read onto the tape without distortion and that the packing density of information on the tape may be optimized.

In order that the tape driving capstan may be rapidly accelerated and decelerated, operation of the clutch-brake mechanism which activates the capstan must be similarly extremely rapid. In addition, the braking and clutching operations must be completely independent whereby the tape driving capstan is not engaged by the clutch mechanism when the brake mechanism is being applied, or vice versa. In view of the large coils and armatures utilized in the electromagnets of the various mechanisms, a large surge current may be required to overcome the initial inertia and cause the mechanisms to move as desired. However, a smaller current can be used to maintain the mechanisms in the respective conditions after the application of the initial surge current and after the mechanism has been actuated. It will be seen, therefore, that in accordance with this invention, a separate thyratron is coupled to each of the brake and clutch coils for supplying a current thereto. In addition, it will be seen that the thyratrons are cross-coupled so that they are each independent in operation. In addition, a large capacitor is coupled to each of the tubes such that the capacitor is charged or discharged depending upon the tube which is fired. By having a single capacitor which is charged and discharged alternately in accordance with the operation of the clutch-brake mechanism, it will be seen that extremely fast operation of the mechanism may be achieved.

Thus, it will be seen that one object of the invention is to provide a circuit which will enable a rapid recycling of a clutch and brake system.

Another object of this invention is to provide a clutch-brake control circuit which uses fewer components and is relatively inexpensive.

Another object of this invention is to provide a clutch-brake control circuit which provides high speed operation in cycling.

Another object of this invention is to provide a clutch-brake control circuit which includes means for providing completely independent operation of the separate mechanism portions.

Another object of this invention is to provide separate actuating circuits which are linked by a common surge current source.

These and other objects and advantages of this invention will become more readily apparent with a reading of a further description of the invention in conjunction with the attached figures in which:

FIGURE 2 is a schematic drawing of the circuit which is used to control the clutch-brake mechanism; and FIGURE 3 is a graphical showing of the current pulse in either the clutch or brake coil when the respective thyratron is fired.

Figure 1:
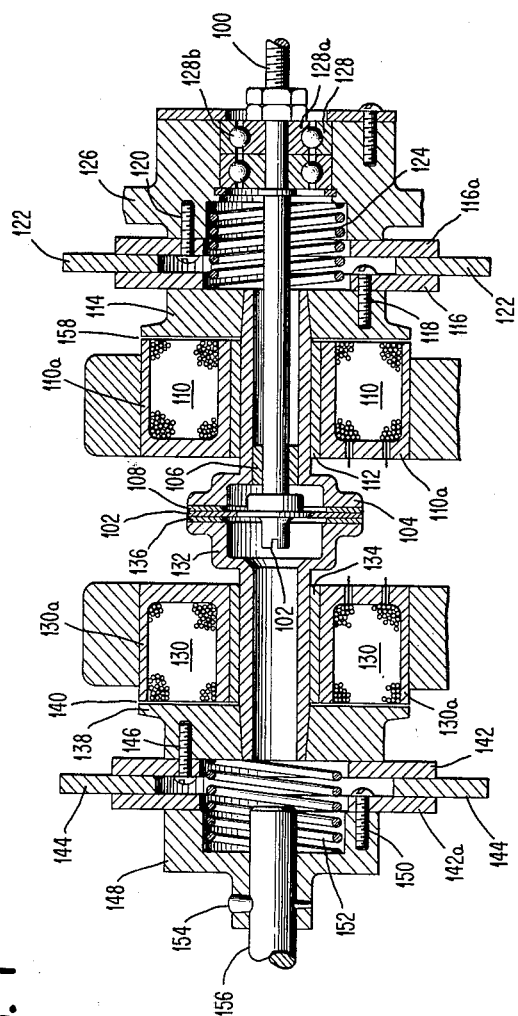
FIGURE 1 is a cross-sectional view of a typical clutch-brake mechanism.

Referring now to FIGURE 1, there is shown a cross-sectional view of a typical unidirectional clutch or clutch-brake mechanism. This type of mechanism is not part of the invention per se and the invention is not limited to this particular clutch-brake mechanism. Rather, the mechanism shown in FIGURE 1 is for exemplary purposes only. However, in order to more fully understand the operation of the circuit, which is the subject of the invention, a description of the clutch-brake mechanism is desirable. It will be seen that the output shaft 100 is adapted to receive at one end thereof a device which may utilize a rotational input, as for example a tape driving capstan (not shown). The output shaft is attached at the other end thereof to the output shaft disc 102. It may be understood that the disc 102 may be attached to shaft 100 by means of a bolt or a nut attached to a threaded portion of the shaft. In the alternative, the disc 102 and the shaft 100 may be a unitary piece which is fabricated by any of the well known methods, as for example machining or molding. The shaft 100 passes through the substantially cylindrically shaped thimble 104. The sleeve bearing 106 assures the axial centering of the shaft 100 in the elongated cylindrical portion of thimble 104. At the flat surface of the bottom of the thimble, a brake facing ring is attached. This brake facing ring may be comprised of hard rubber or cork or other similar material. Surrounding the thimble 104, there is the brake coil 110. This coil is an extremely large coil capable of handling a current on the order of several amperes. The coil 100 is the means whereby the solenoid effect of the brake mechanism is effected as will become clear subsequently. In addition, the brake coil 110 is firmly attached to the overall frame of the tape handling system, whereby the brake coil is not free to move in any direction. A sleeve bearing 112 passes through the axial hole of the cup 110a within which the brake coil 110 is placed. A bearing 112 provides means for centering the thimble 104 and permitting movement of thimble 104 through the center hole in the cup 110a. The brake armature 114 is attached to the top end of the thimble 104. The thimble and armature 114 are mated together in a tapered force-fit whereby the armature 114 and thimble 104 form effectively a unitary piece. Typically, the armature 114 is fabricated of a magnetic material, for example soft iron, which is spaced a very small distance away from the coil 110. The armature gap is on the order of only a few mills whereby rapid action of the braking mechanism may be achieved.

Coupled to the armature 114 is a coupling piece 116. Coupling piece 116 may be attached to the armature 114 by means of screws as for example screw 118. These screws may be located around the surface of the annular armature and spaced by approximately 120°. A further coupling piece 116a is coupled to the frame of the apparatus as was the case of the brake coil cup 110a. Again, coupling piece 116a may be attached to the frame by screws for example 120 which may be spaced at again 120° intervals around the annular surface of the frame. Between the coupling pieces 116 and 116a, there is a third coupling piece 122. This member is used to couple the coupling pieces 116 and 116a together whereby they may move relative to each other in a radial direction but not in an angular direction. Thus, the armature 114 may slide along shaft 100 toward (or from) brake coil 110 but it cannot rotate angularly with shaft 100. A compression spring 124 is utilized to regulate the spacing of the armature 114 from the coil 110. This spring should be sufficient to urge armature 114 toward coil 110 but not completely in contact therewith. It will be seen that shaft 100 is mounted within the annular frame 126 and spaced by the bearing comprising inner-race 128a and outer-race 128 and thrust bearings 128b. The inner-race and the outer-race are any of the well known devices for performing this operation with the thrust bearings 128b being for example ball bearings whereby the shaft 100 is actually centered by the inner-race 128a but is permitted to rotate within the fixed frame 126. This type of bearing arrangement is not absolutely essential but represents a preferred embodiment of the invention.

The clutch mechanism is very much similar to the brake mechanism. Thus, the clutch coil 130 is wound within a clutch coil cup 130a. The clutch coil cup 130a is attached to the frame of the overall apparatus. Through the central hole in the cup, passes a thimble 132. The thimble 132 is centered in the central opening of cup 130a by sleeve bearing 134. The lower substantially flat end of thimble 132 has attached thereto a clutch facing ring 136. This clutch facing ring 136 is similar to brake facing ring 108 and may be fabricated of cork or hard rubber or other material. A preferred material is Rulon A. The upper tapered end of thimble 132 is fitted into an armature 138. Clutch armature 138 is spaced from the clutch coil 130 by the clutch armature gap 140. This gap is extremely small in order to avoid problems of inertia and to permit rapid motion of the armature and therefore rapid operation of the clutch-brake mechanism. Because of the tapered force-fit of the thimble 132 and armature 138, it will be clear that when the armature 138 is moved by electromagnetic action of coil 130 the clutch thimble 132 will also move. The clutch armature 138 is attached, for example by screws 146, to a coupling member which comprises coupling pieces 142 and 142a and the coupling member 144. Coupling member 142a is attached to the annular frame 148 by, for example, screws 150. The coupling member 144 couples the members 142 and 142a whereby linear motion is permitted. Contra, to the case of annular frame member 126, housing member 148 is not fastened to the frame of the overall apparatus and is free to rotate. Therefore, the coupling means comprising numbers 142, 142a and 144 is forced to rotate with the housing member 148. The compression spring 152, as in the case of compression spring 124, causes the pre-loading of armature 138 whereby the gap 140 is maintained small. The pin 154 passes through an opening in frame 150 and through a hole in motor shaft 156 thereby coupling the frame 150 to the shaft 156. Shaft 156 is the output shaft of a motor or the like (prime mover). Thus, because of the coupling, as the motor (not shown) rotates, the motor shaft 156 rotates whereby the entire clutch mechanism (with the exception of the clutch coil 130) rotates at all times.

The operation of this clutch-brake mechanism is such that, as previously described, the clutch mechanism is rotating at all times. However, an extremely small spacing exists between the clutch facing ring 136 and the output shaft disc 102 whereby the output shaft 100 is not caused to rotate unless the clutch coil 130 is energized whereby the armature 138 is pulled forward. The motion of the armature 138 inherently moves the thimble 132 whereby the clutch facing ring 136 is forced against the output shaft disc 102 thereby causing shaft 100 to rotate. When the clutch coil has been de-energized and shaft 100 made to rotate, it will be seen that the shaft 100 will continue to rotate (due to forces of inertia) even if the energization current is removed from clutch coil 130. Consequently, the brake mechanism is utilized to positively stop the shaft 100 from rotating. This operation is achieved by applying an energization current to brake coil 110 whereby armature 114 is moved toward the coil 110. As the armature 114 moves, thimble 104 also moves such that the brake facing ring 108 engages output shaft 102. In view of the fact that the thimble 104 which is attached to armature 114 cannot rotate because of coupling members 116, 116a and 122 which are rigidly fastened to frame 126, the shaft 100 is prohibited from turning (even though the motor shaft 156 continues to turn and continues to drive clutch thimble 132 which is disengaged from output shaft disc 102).

As will be seen, there is required a control circuit which controls the energization currents applied to the brake and/or clutch coils. Referring now to FIGURE 2, such a circuit is shown. The brake portion of the circuit includes the tube 200. This tube is preferably a thyratron whereby a high current conduction is possible. The cathode of thyratron 200 is connected to ground. The anode of thyratron 200 is connected to one terminal of impedance 204. Another terminal of impedance 204 is connected to one terminal of the brake coil 206; the other terminal of brake coil 206 is connected to one terminal of variable impedance 208 which has another terminal thereof connected to voltage source +E1. The source +E1 produces a high voltage for example +600 volts. The variable impedance 208 may be, for example, a potentiometer or variable resistor wherein the center tap thereof is coupled to the terminal of impedance 208 which is coupled to brake coil 206. Typical values for this resistor is 2500 ohms and 400 watts. This impedance, in series with the impedance 204 which may typically be a resistor of 500 ohms and 500 watts, controls the current which flows through brake coil 206 and thyratron 200. A capacitor 210 is connected in parallel with impedance 208. That is, capacitor 210 which typically may be 4 microfarads has one side thereof connected to source +E1 and the other side thereof connected to the center tap of resistor 208. This capacitor provides the path whereby a large surge current may flow through the brake coil 206 as will be discussed more thoroughly subsequently. The input grid of thyratron 200 is coupled to a voltage divider network comprising impedances 212, 214 and 216. Impedance 212 is coupled between the grid of thyratron 200 and the junction of impedances 214 and 216. Typically, a value of impedance 212 may be 100,000 ohms. Impedance 214 which may typically be 150,000 ohms has one end thereof connected to ground and the other end thereof connected to a terminal of impedance 212 and one terminal of impedance 216. Impedance 216 which typically may be 637,000 ohms, 1 watt has the other terminal thereof connected to source —E2 which may typically be —150 volts. The voltage divider network connected to the first grid of thyratron 200 is designed to normally keep the thyratron in the OFF condition in the absence of an input signal.

Coupled to the resistor 212 is a driving flip-flop 218. Flip-flop 218 is shown graphically as an input source to the thyratron flip-flop and may be of any of the well known types. When flip-flop 218 applies a signal to the voltage divider network junction at the terminal of impedance 212, the thyratron 200 is turned ON whereby brake coil 206 may be energized. The second grid of thyratron 200 has coupled thereto a filter circuit comprising capacitor 220 and resistor 222. In addition, the second grid has attached thereto a diode 224. The polarity of diode 224 is such that the anode thereof is connected to the grid of the thyratron 200 and the diode cathode is connected to a resistor 226 which is coupled at the other end thereof to resistor 228 which is then coupled to ground. Typically, the capacitor 220 may be 0.1 microfarad, the resistor 222 may be 12,000 ohms, the resistor 226 may be 4,700 ohms and the resistor 228 may be 100,000 ohms. This circuit is designed to bias the second grid of thyratron 200 to a desired operating point. In addition, the diode 224 is connected such that thyratron 200 cannot be turned ON by a signal generated by thyratron 202 via capacitor 230 which is connected between the anode of thyratron 202 and the junction of resistors 226 and 228. Typically, capacitor 230 may be 0.01 microfarad and is utilized in conjunction with diode 224 to form a cross-coupling network between thyratron 200 and thyratron 202 whereby when thyratron 200 is turned ON and thyratron 202 is automatically quenched (as described subsequently), thyratron 202 is maintained OFF.

The clutch portion of the circuit utilizes thyratron 202 as the driving element. The anode of thyratron 202 is coupled via resistor 232 which may typically be 50 ohms, 50 watts to clutch coil 234 which is then coupled to source $+E1$. The cathode of thyratron 202 is coupled to one terminal of variable impedance 236 which may typically be 2,500 ohms, 400 watts and which has another terminal thereof connected to ground. In addition, the variable tap or center tap is also connected to ground. Resistors 236 and 232 therefore control the current flowing through thyratron 202 when the clutch coil 234 is energized. The cathode of thyratron 202 is further connected to the junction of capacitor 210 and resistor 208. Coupled between the first grid of thyratron 202 and the cathode of the thyratron, is an impedance network comprising resistor 238 which typically may be 10,000 ohms and resistor 240 which typically may be 100,000 ohms. This resistor network has the junction thereof coupled to one terminal of resistor 242 which may typically be 681,000 ohms, 2 watts the other end of which is coupled to $-E2$. This resistor network in conjunction with resistor 236 is effective to regulate the bias voltages at the cathode and the first grid of thyratron 202. Thyratron 202 has coupled thereto (between said grid and the cathode of thyratron 202) a filter network comprising capacitor 244 and variable resistor 246. Typically, resistor 246 may be 20,000 ohms and capacitor 244 may be 0.1 microfarad. The variable tap of resistor 246 is returned to the terminal of resistor 246 which is coupled to the cathode of thyratron 202. Also coupled to the grid of thyratron 202 is diode 248. Diode 248 is so poled that the anode thereof is coupled to the grid of thyratron 202 and the cathode thereof is coupled to impedance 250 which typically may be 4,700 ohms. The other end of impedance 250 is coupled to impedance 252 and capacitor 254. Impedance 252 which may typically be 100,000 ohms has the other end thereof returned to the cathode of thyratron 202. Capacitor 254 which may typically be 0.01 microfarad has the other end thereof connected to the anode of thyratron 200. (If desirable, of course, the capacitor 254 may be coupled to the junction between impedance 204 and brake coil 206.) It will be seen that this latter circuit again operates as a cross-coupling between thyratron 202 and thyratron 200, whereby when thyratron 202 is turned ON by the application of a signal from flip-flop 218 to the first grid of thyratron 202 via impedance 238 and thyratron 200 is quenched, thyratron 200 is maintained in the OFF condition.

Between the anodes of thyratrons 200 and 202 there is connected the cross-coupled quenching network. This quenching network comprises impedance 256 which typically may be a 250 ohm, 25 watt resistor connected in series with capacitor 258 which may tpically have a value of 0.25 microfarad. This network serves to quench the previously ON thyratron, when the previously OFF thyratron is turned ON by the application of an input signal by flip-flop 218.

In the operation of the circuit, a brake signal produced by flip-flop 218 is applied to thyratron 200 via impedance 212 whereby the thyratron is fired. In actuality, the flip-flop 218 is designed such that when the circuit is initially activated, flip-flop 218 assumes one condition (set) such that brake thyratron 200 fires. Thus, the thyratron 200 switches from a high impedance to a low impedance in the circuit and a large current tends to flow from source $+E1$ through to ground. In view of the fact that a sudden change takes place in the circuit, which sudden change appears substantially as a step function having high frequency components, the capacitor 210 appears as a low impedance path in the circuit. Hence, a large current flows through capacitor 210, through coil 206, through impedance 204 and through thyratron 200 to ground. As capacitor 210 charges up, the impedance thereof increases rapidly. Consequently, the current begins to flow through the lower impedance of resistor 208. Thus, there has been established a large initial surge current which is utilized to rapidly draw the brake armature 114 toward the brake coil 110 (FIGURE 1). However, when the impedance of the capacitor 210 is sufficiently large, the current is diverted through impedance 208, through coil 206, etc. This current is the holding current which maintains armature 114 in position against coil 110 (FIGURE 1). In addition, thyratron 202 has been clamped to its cut-off point by the cross-coupled quenching network of capacitor 258 and resistor 256.

Contrariwise, when the signal from flip-flop 218 is applied to the first grid of thyratron 202 via impedance 238, thyratron 202 is turned ON. Because of the connection between the cathode of thyratron 202 and capacitor 210, the capacitor 210 initially discharges through the network including clutch coil 234, impedance 232, thyratron 202 and wire 260. This initial current produced by the discharging of capacitor 210 provides the initial surge current required to draw clutch armature 138 against the clutch coil 130 whereby output shaft 100 is driven (FIGURE 1). When the capacitor 210 is fully discharged, the current through the clutch coil circuit flows from source $+E1$ through to ground via thyratron 202 and the current limiting resistors 232 and 236 in series therewith. This current path provides the holding current for the clutch coil circuit. Once more, because of the cross-coupling circuits and the bias networks, thyratron 200 is maintained in its OFF state while thyratron 202 conducts.

It will be seen that this control circuit provides for rapid and efficient operation of a clutch-brake mechanism. That is, when the brake circuit is operative, the capacitor 210 is being charged while providing the initial inertia-overcoming surge-current. Therefore, capacitor 210 is fully charged and ready for use when the clutch circuit is triggered by an input signal from flip-flop 218. Thus, the capacitor 210 is capable of being switched from the charging to discharging state by the independent operation of one or the other of the circuits. Therefore, when the non-operative circuit is switched so that it becomes operative, an initial surge current is immediately available for the circuit. It will be seen that by having this surge current immediately available to either of the brake or clutch circuits, there is no time delay required in order to have the capacitor charged as is the case in many other control circuits. Typical operational characteristics are illustrated in FIGURE 3.

Referring now to FIGURE 3 there is shown graphically the representation of a current through the clutch and/or brake coil with respect to time. In particular, the current is represented in terms of amperes and the time is represented in terms of milliseconds. The time $t=0$ is defined as the time when the input signal is applied to one of the thyratrons by flip-flop 218 (FIGURE 2). Immediately, the surge current is supplied to the coil via capacitor 210. That is, the capacitor 210 is either charging or discharging while the surge current is being supplied to the coil in question. About 900 microseconds after the application of the input signal by flip-flop 218, the surge current produced via capacitor 210 has peaked. This surge current will peak between 1.5 and 2.0 amperes depending upon the impedances in series with the various coils. (Of course, the parameters may be changed to obtain larger or smaller peak currents.) It will be seen that in the worst case analysis, the clutch or brake will have been activated at about 900 microseconds after the energization pulse was supplied by the flip-flop 218. Clearly, it is assumed that a coil requirement will not be such that the peak surge current must be produced in order to provide the proper actuation of the desired clutch or brake mechanism, but will rather be actuated at a lower current and consequently in a much shorter time. However, the peak current provides a certain assurance that the mechanism will be actuated. After the surge current has peaked, it declines until the holding current is achieved.

The holding current may be, for example, on the order of 0.3 ampere (300 milliamps). The holding current is the current which is required to hold the clutch or brake in the position to which it has been switched. It may be the case that in some mechanisms the clutch and brake holding currents are different. In the example described, the required clutch holding current is on the order of 300 milliamps and the required brake holding current is on the order of 270 milliamps. However, it will be seen that the holding currents are substantially the same and no problem will be encountered in altering the impedances in the various circuits to achieve the necessary holding current.

Although the minimum holding time for the circuit is on the order of about 3.0 milliseconds, as shown in FIGURE 3, the maximum holding time for the circuit is relatively indefinite. That is, a holding current will maintain the clutch-brake mechanism in the desired condition until another signal is applied by the flip-flop 218.

There is a minimum current below which the coil will not cause the armature to be held thereagainst and which will, in effect, not actuate the associated mechanism. This current which is less than the minimum holding current is determined in the individual cases. In particular, this minimum current is suggested in FIGURE 3 by the current level shown after the 3.0 milliseconds time. The pulse represented by 302 is not necessarily found in all applications of this circuit. However, it is occasionally found when the flip-flop 218 (FIGURE 2) is applying the other signal to the previously unenergized circuit. That is, when the circuit for which the pulse is shown is being turned OFF and the other circuit which was previously OFF is being turned ON, a pulse similar to pulse 302 may appear in the current of the circuit being turned OFF. However, as the pulse spikes may be seen to be fairly small there is no deleterious effect caused thereby. After this pulse, it may be seen that the current level is reduced below the minimum holding current level for the particular circuit involved. Thus, the circuit is effectively switched OFF by the application of the input signal to the thyratron which is to be turned ON. This switching OFF is effected by the cross-coupling between the thyratrons 202 and 200 in FIGURE 2.

It is to be understood that the embodiments shown and described supra are not meant to be limitative of the instant invention, but rather are meant to illustrate the principle of operation. The embodiments may be altered by changing the various components involved and by changing the parameters which will regulate the current magnitudes and the length of the time periods of operation of the circuit. For example, the thyratrons may be replaced by silicon controlled rectifiers provided the cross-coupling and triggering networks are altered accordingly. In particular, one alteration which may be made can be seen in FIGURE 2 where capacitor 256 (shown dashed) is connected in parallel with resistor 236. This optional capacitor will permit improved operation of the circuit if it is necessary or desirable to have the clutch circuit operate first. This and other changes within the scope of this invention are meant to be included within the scope of the principle described by the appended claims.

Having thus described the invention what is claimed is:

1. A clutch-brake unit control circuit comprising, a brake energizing coil, a clutch energizing coil, a first thyratron connected to one of said coils, a second thyratron connected to the other of said coils, means connected to each of said thyratrons to control the conduction state thereof, a cross-coupling network coupled between said thyratrons whereby said thyratrons are mutually exclusively operable, an energy source, and an energy storing element connected to said energy source and in series with both of said coils, said energy storing element being connected so that energy from said source is stored therein when said brake coil is energized by current flow therethrough and the energy stored therein is supplied thereby when said clutch coil is energized by current flow therethrough, said coils being energized by the operation of the associated thyratron.

2. A control circuit for a clutch-brake unit and comprising, a brake energizing coil, a clutch energizing coil, first and second thyratrons each having an anode, a cathode and a control grid, the anode of said first thyratron connected to one terminal of one of said coils, the anode of said second thyratron connected to one terminal of the other of said coils, driving means connected to the control grid of each of said thyratrons to control the conduction state thereof, the cathodes of said thyratrons connected to a reference potential source, a cross-coupling network coupled between said thyratrons whereby said thyratrons are mutually exclusively operable, an energy source, and an energy storing element connected to said energy source and between further terminals on each of said coils such that energy from said source is stored therein when said brake coil is energized by current flow therethrough and the energy stored therein is supplied thereby when said clutch coil is energized by current flow therethrough due to the conduction of the associated thyratron, said energy storing element thereby providing a pulse of large magnitude current through the affected coil.

3. A clutch-brake unit control circuit comprising, a brake energizing coil, a clutch energizing coil, a first thyratron connected to a first terminal of said brake coil, a second thyratron connected to a first terminal of said clutch coil, input means connected to each of said thyratrons to control the conduction state thereof, a cross-coupling network coupled between said thyratrons whereby said thyratrons are mutually exclusively operable, a capacitor connected between a second terminal of each of said brake and clutch coils such that energy is stored therein when said brake coil is initially energized by current flow therethrough and energy is supplied thereby when said clutch coil is initially energized by current flow therethrough due to the operation of the associated thyratrons, and a potential source connected to said capacitor and said coils to supply energy thereto.

4. In combination, first and second thyratrons each having an anode, a cathode and a control grid, first and second electromagnet coils each having first and second terminals, said first and second coils having the first terminals thereof respectively connected to the anodes of said first and second thyratrons, a capacitor having first and second terminals, said first terminal of said capacitor connected to said second terminal of said first coil, said second terminal of said capacitor connected to said second terminal of said second coil, a potential source connected to said second terminal of said capacitor, impedance means connected between said potential source and said first terminal of said capacitor, bias means connected to said cathodes and said control grids of said first and second thyratrons to normally bias said thyratrons to the non-conducting state, means interconnecting said first and second thyratrons to assure mutually exclusive operation thereof, and driving means connected to the control grids of said first and second thyratrons to control the conduction state thereof.

5. The combination of claim 4 in which, said capacitor charges when said first thyratron conducts thereby causing current flow through said first coil and said capacitor discharges when said second thyratron conducts thereby causing current flow through said second coil.

6. The combination of claim 4 in which, said driving means comprises a flip-flop circuit for alternately supplying signals to said control grids of said first and second thyratrons such that said thyratrons are alternately rendered conductive.

7. In combination, first and second thyratrons each having an anode, a cathode and a control grid, each of said thyratrons characterized by conductive and non-conductive states, first and second electromagnet coils each having at least first and second terminals thereof, said first and second coils having the first terminals thereof respectively connected to the anodes of said first and second thyratrons, a capacitor having at least first and second terminals, said first terminal of said capacitor connected to said second terminal of said first coil, said second terminal of said capacitor connected to said second terminal of said second coil, a potential source connected to said second terminal of said capacitor, impedance means connected between said potential source and said first terminal of said capacitor, said capacitor providing a low impedance current path between said potential source and said first coil such that a large surge current passes through said first coil until said capacitor is fully charged whereupon said impedance means provides the current path between said first coil and said potential source when said first thyratron is conductive, said capacitor providing a low impedance source in parallel with said potential source such that a large surge current passes through said second coil until said capacitor is fully discharged whereupon said potential source is connected to said second coil when said second thyratron is conductive, said potential source adapted to provide a substantially constant current through the coil associated with the conductive thyratron when said capacitor is not actively operative in the circuit, bias means connected to said cathodes and said control grids of said first and second thyratrons to normally bias said thyratrons to the non-conducting state, means interconnecting said first and second thyratrons to assure mutually exclusive operation thereof, and driving means connected to the control grids of said first and second thyratrons to control the conduction state thereof.

8. In combination, first and second thyratrons each having an anode, a cathode and a control grid, first and second electromagnet coils each having at least first and second terminals, said first and second coils having the first terminals thereof respectively connected to the anodes of said first and second thyratrons, a capacitor connected between the respective second terminals of said first and second coils, a potential source connected to said second terminal of said first and second coils, bias means connected to said cathodes and said control grids of said first and second thyratrons to normally bias said thyratrons to the non-conducting state, means interconnecting the anodes and control grids of said first and second thyratrons to assure mutually exclusive operation thereof, and driving means connected to the control grids of said first and second thyratrons to control the conduction state thereof, said capacitor connected such that surge current passes therethrough to one of said coils when the associated thyratron fires, said surge current being limited by the charge and discharge characteristics of said capacitor.

9. The combination recited in claim 8 including, impedance means connected between said potential source and said second terminal of said first coil such that substantially steady current flow different from said surge current exists in said first coil when said first thyratron is conducting after the surge current has passed through said first coil.

References Cited in the file of this patent
UNITED STATES PATENTS

| | | |
|---|---|---|
| 2,925,585 | Bruce | Feb. 16, 1960 |
| 2,951,186 | Dickinson | Aug. 30, 1960 |
| 2,954,512 | Hardison | Sept. 27, 1960 |
| 3,021,454 | Pickens | Feb. 13, 1962 |
| 3,030,554 | Leeson | Apr. 17, 1962 |
| 3,069,600 | Leeson | Dec. 18, 1962 |